United States Patent
Wang et al.

(10) Patent No.: US 12,002,253 B2
(45) Date of Patent: Jun. 4, 2024

(54) FEATURE POINT INTEGRATION POSITIONING SYSTEM, FEATURE POINT INTEGRATION POSITIONING METHOD AND NON-TRANSITORY COMPUTER-READABLE MEMORY

(71) Applicant: Automotive Research & Testing Center, Changhua County (TW)

(72) Inventors: Yu-Fang Wang, Changhua County (TW); Yi-Jie Lin, Changhua County (TW); Cheng-Kai Wang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 42 days.

(21) Appl. No.: 17/456,646

(22) Filed: Nov. 29, 2021

(65) Prior Publication Data

US 2023/0169747 A1  Jun. 1, 2023

(51) Int. Cl.
    *G06V 10/44*   (2022.01)
    *G06V 10/46*   (2022.01)
    *G06V 20/64*   (2022.01)

(52) U.S. Cl.
    CPC .......... *G06V 10/443* (2022.01); *G06V 10/462* (2022.01); *G06V 20/64* (2022.01)

(58) Field of Classification Search
    CPC ..... G06V 10/443; G06V 10/462; G06V 20/64
    See application file for complete search history.

(56) References Cited

U.S. PATENT DOCUMENTS

| | | | |
|---|---|---|---|
| 11,176,701 B2 * | 11/2021 | Kitaura | ..................... G06T 7/74 |
| 2020/0175311 A1 | 6/2020 | Xu et al. | |
| 2021/0094536 A1 | 4/2021 | Suzuki | |

FOREIGN PATENT DOCUMENTS

| CN | 110556012 A | 12/2019 |
|---|---|---|
| CN | 111739144 A | 10/2020 |

(Continued)

OTHER PUBLICATIONS

"Weikang Fang et. al., FPGA-based ORB Feature Extraction for Real-Time Visual SLAM, 2017 International Conference on Field Programmable Technology, 2017, International Conference on Field Programmable Technology, Australia" (Year: 2017).*

(Continued)

*Primary Examiner* — Andrae S Allison
*Assistant Examiner* — Phuong Hau Cai
(74) *Attorney, Agent, or Firm* — CKC & Partners Co., LLC

(57) ABSTRACT

A feature point integration positioning system includes a moving object, an image input source, an analyzing module and a positioning module. The image input source is disposed at the moving object to shoot an environment for obtaining a sequential image dataset. The analyzing module includes a machine vision detecting unit configured to generate a plurality of first feature points in each of the images based on each of the images, a deep learning detecting unit configured to generate a plurality of second feature points in each of the images based on each of the images, and an integrating unit configured to integrate the first feature points and the second feature points in each of the images into a plurality of integrated feature points in each of the images. The positioning module confirms a position of the moving object relative to the environment at each of the time points.

6 Claims, 7 Drawing Sheets

(56) References Cited

FOREIGN PATENT DOCUMENTS

| CN | 112078593 | A |   | 12/2020 |            |
|----|-----------|---|---|---------|------------|
| CN | 112348869 | A |   | 2/2021  |            |
| CN | 112419317 | A | * | 2/2021  |            |
| CN | 108171249 | B | * | 3/2022  | G06K 9/4671 |

OTHER PUBLICATIONS

"D. Androutsos et. al., A Novel Vector-Based Approach to Color Image Retrieval Using a Vector Angular-Based Distance Measure, Computer Vision and Image Understanding, vol. 75, Nos. ½, Jul./Aug. 1999, pp. 46-58" (Year: 1999).*

Felix Endres et. al. An evaluation of the RGB-D Slam System, May 2012, 2012 IEEE International Conference on Robotics and Automation, Saint Paul, MN, USA (Year: 2019).*

"M. Pollefeys et. al., Detailed Real-Time Urban 3D Reconstruction from Video, 2008, Int J Comput Vis 2008 78: 13-167" (Year: 2008).*

Tong Qin et al., "AVP-SLAM: Semantic Visual Mapping and Localization for Autonomous Vehicles in the Parking Lot", earliest submission date on Jul. 3, 2020, e-print, accessed at https://arxiv.org/pdf/2007.01813v1.pdf, United States.

Rong Kang et al., "DF-SLAM: A Deep-Learning Enhanced Visual SLAM System based on Deep Local Features", earliest submission date on Jan. 22, 2019, e-print, accessed at https://arxiv.org/pdf/1901.07223v1.pdf, United States.

\* cited by examiner

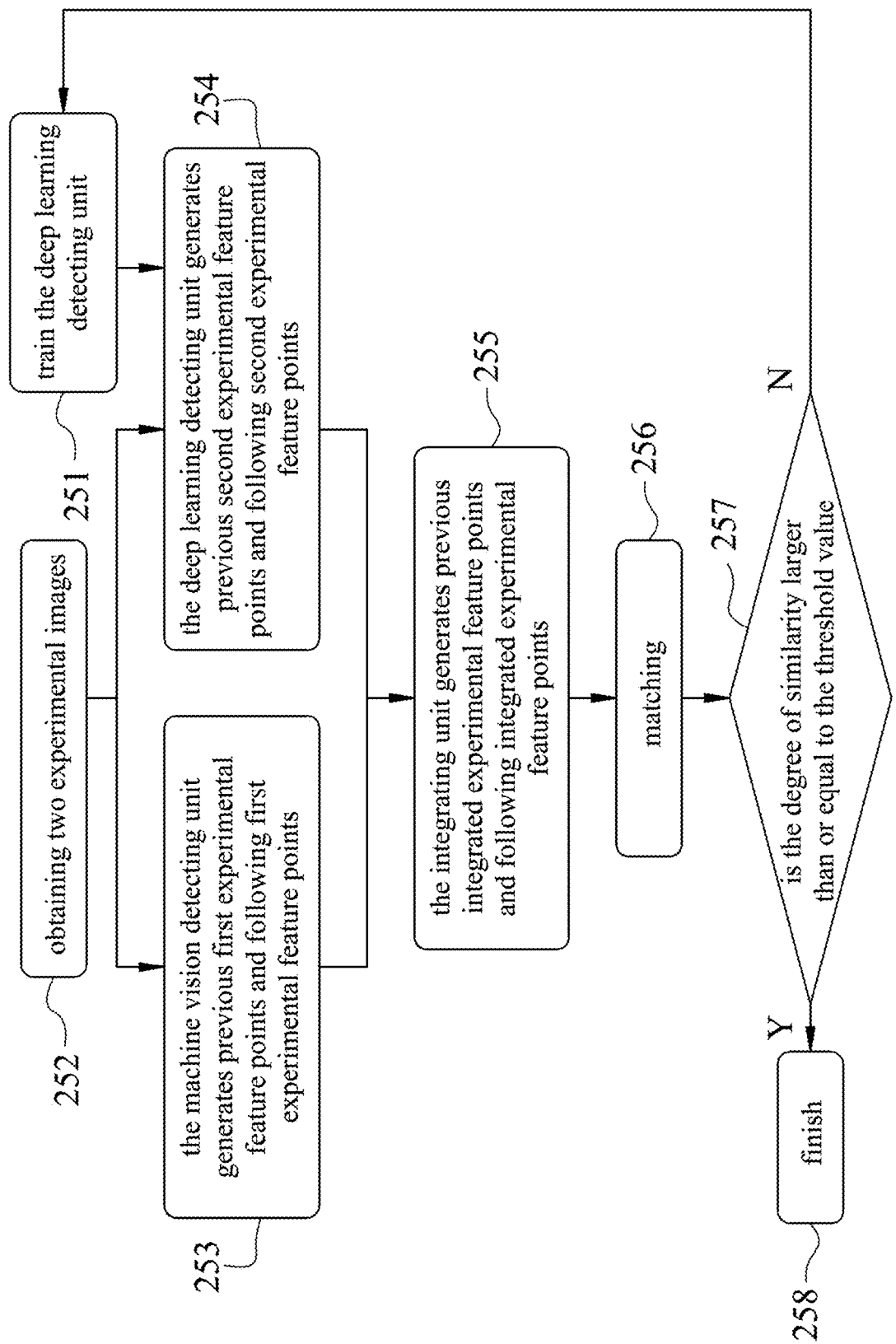

FEATURE POINT INTEGRATION POSITIONING SYSTEM, FEATURE POINT INTEGRATION POSITIONING METHOD AND NON-TRANSITORY COMPUTER-READABLE MEMORY

BACKGROUND

Technical Field

The present disclosure relates to a feature point integration positioning system and a feature point integration positioning method. More particularly, the present disclosure relates to a feature point integration positioning system and a feature point integration positioning method applied for the visual SLAM.

Description of Related Art

A simultaneous localization and mapping (SLAM) technique is to detect the features of the environment during a moving process of an object to construct the map of the environment and identify the relation between the object and the environment. With the characteristic that the localization and the mapping can be done simultaneously, the requirement of the SLAM is increased and the SLAM is applied for the indoor automated packing, the warehouse logistics management, and the phone exhibition tour, etc. Moreover, the visual SLAM, which detects the images, is more widely used than the radar SLAM, which detects the point clouds, in the market owing to the cost of the sensors.

For the visual SLAM, the positioning stability is also very important in addition to the positioning accuracy. Lack of stability is the biggest problem of the conventional SLAM, which results in position loss during the positioning process. Moreover, the conventional SLAM has a problem that it spends too much time to find the original position after losing the position, and the position lost problem is obvious in the situation with severe environment variations, such as corners and locations having light contrast. In addition, the conventional SLAM has poor positioning accuracy outside, and is easily affected by environment variations, such as locations having high light contrast caused by the front lighting and the back lighting, road corners and different car arrangements, to lose the position or the mapping.

Based on the abovementioned problems, how to increase the positioning stability of the visual SLAM becomes a pursued target for practitioners.

SUMMARY

According to one aspect of the present disclosure, a feature point integration positioning system includes a moving object, an image input source, an analyzing module and a positioning module. The image input source is disposed at the moving object and configured to shoot an environment for obtaining a sequential image dataset. The sequential image dataset includes a plurality of images, and each of the images corresponds to each of a plurality of time points. The analyzing module is signally connected to the image input source to receive the sequential image dataset. The analyzing module includes a machine vision detecting unit configured to generate a plurality of first feature points in each of the images based on each of the images, a deep learning detecting unit configured to generate a plurality of second feature points in each of the images based on each of the images, and an integrating unit configured to integrate the first feature points and the second feature points in each of the images into a plurality of integrated feature points in each of the images. The positioning module is signally connected to the analyzing module, and the positioning module receives the integrated feature points in each of the images to confirm a position of the moving object relative to the environment at each of the time points.

According to another aspect of the present disclosure, a feature point integration positioning method includes a shooting step, an analyzing step, an integrating step and a positioning step. In the shooting step, an environment is shot by an image input source to obtain a sequential image dataset, the sequential image dataset includes a plurality of images, and each of the images corresponds to each of a plurality of time points. In the analyzing step, a plurality of first feature points in each of the images are generated by a machine vision detecting unit based on each of the images, and a plurality of second feature points in each of the images are generated by a deep learning detecting unit based on each of the images. In the integrating step, the first feature points and the second feature points in each of the images are integrated by an integrating unit into a plurality of integrated feature points in each of the images. In the positioning step, a moving object is positioned according to the integrated feature points in each of the images.

BRIEF DESCRIPTION OF THE DRAWINGS

The disclosure can be more fully understood by reading the following detailed description of the embodiments, with reference made to the accompanying drawings as follows:

FIG. 7 is a flow chart showing a previous matching step of the feature point integration positioning method of FIG. 6.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 1:
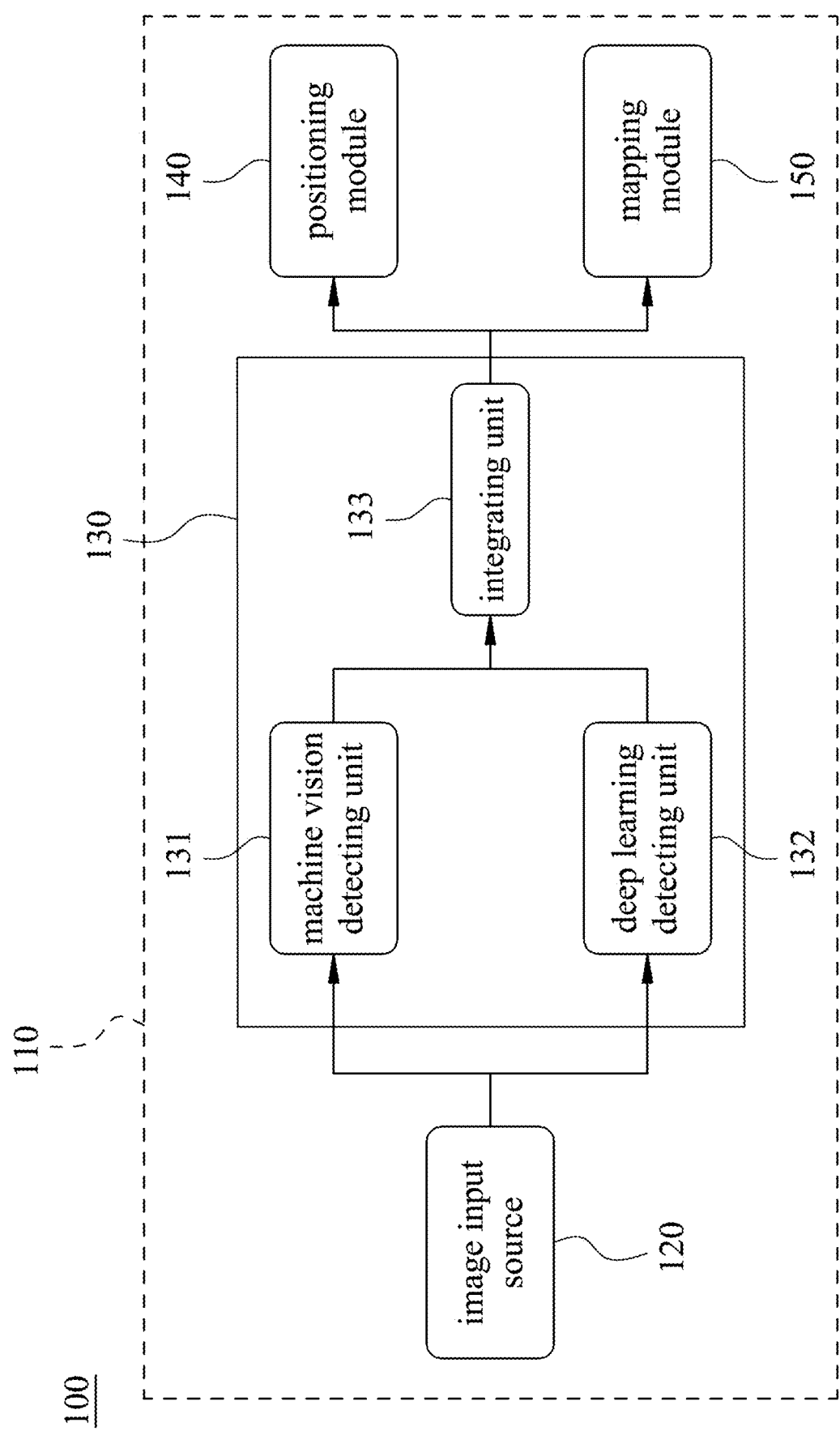
FIG. 1 is a block diagram showing a feature point integration positioning system according to one embodiment of the present disclosure.

FIG. 1 is a block diagram showing a feature point integration positioning system 100 according to one embodiment of the present disclosure. Please refer to FIG. 1, a feature point integration positioning system 100 includes a moving object 110, an image input source 120, an analyzing module 130 and a positioning module 140. The image input source 120 is disposed at the moving object 110 and configured to shoot an environment for obtaining a sequential image dataset. The sequential image dataset includes a plurality of images, and each of the images corresponds to each of a plurality of time points. The analyzing module 130 is signally connected to the image input source 120 to receive the sequential image dataset. The analyzing module 130 includes a machine vision detecting unit 131 configured to generate a plurality of first feature points F1 (shown in FIG. 2) in each of the images based on each of the images, a deep learning detecting unit 132 configured to generate a plurality of second feature points F2 (shown in FIG. 3) in each of the images based on each of the images, and an integrating unit 133 configured to integrate the first feature points F1 and the second feature points F2 in each of the images into a plurality of integrated feature points F3 (shown in FIG. 4) in each of the images. The positioning module 140 is signally connected to the analyzing module 130, and the positioning module 140 receives the integrated feature points F3 in each of the images to confirm a position of the moving object 110 relative to the environment at each of the time points.

Therefore, through the second feature points F2 generated by the deep learning detecting unit 132, the insufficiency of the first feature points F1 can be compensated, thereby increasing the positioning accuracy and the positioning stability. The details of the feature point integration positioning system 100 will be described hereinafter.

The image input source 120 can include at least one camera, and a movable object such as a car or a robot carrying the image input source 120 can be defined as the moving object 110. During the exercising process of the moving object 110, the image input source 120 can shoot an image series in a time series; in other words, the image input source 120 shoots one image of the environment at a first time point, shoots another image of the environment at a second time point, and keeps shooting to generate images to form the sequential image dataset.

When the analyzing module 130 receives the sequential image dataset, the images thereof can be analyzed in real-time, the images can be simultaneously or sequentially analyzed by the machine vision detecting unit 131 and the deep learning detecting unit 132, and the first feature points F1 and the second feature points F2 can be generated therefrom, respectively. Please be noted that, the so-called feature points in the present disclosure can indicate the points in an image where the gray values vary obviously, or the points in an image where the outline curvatures of the items thereof are large, and the definition of the feature points is well known in the technical field and will not be mentioned again. In addition, in the present disclosure, for the situation that there is no need to point out the first feature points, the second feature points or the integrated feature points, the term "feature points" will be used.

Figure 2:
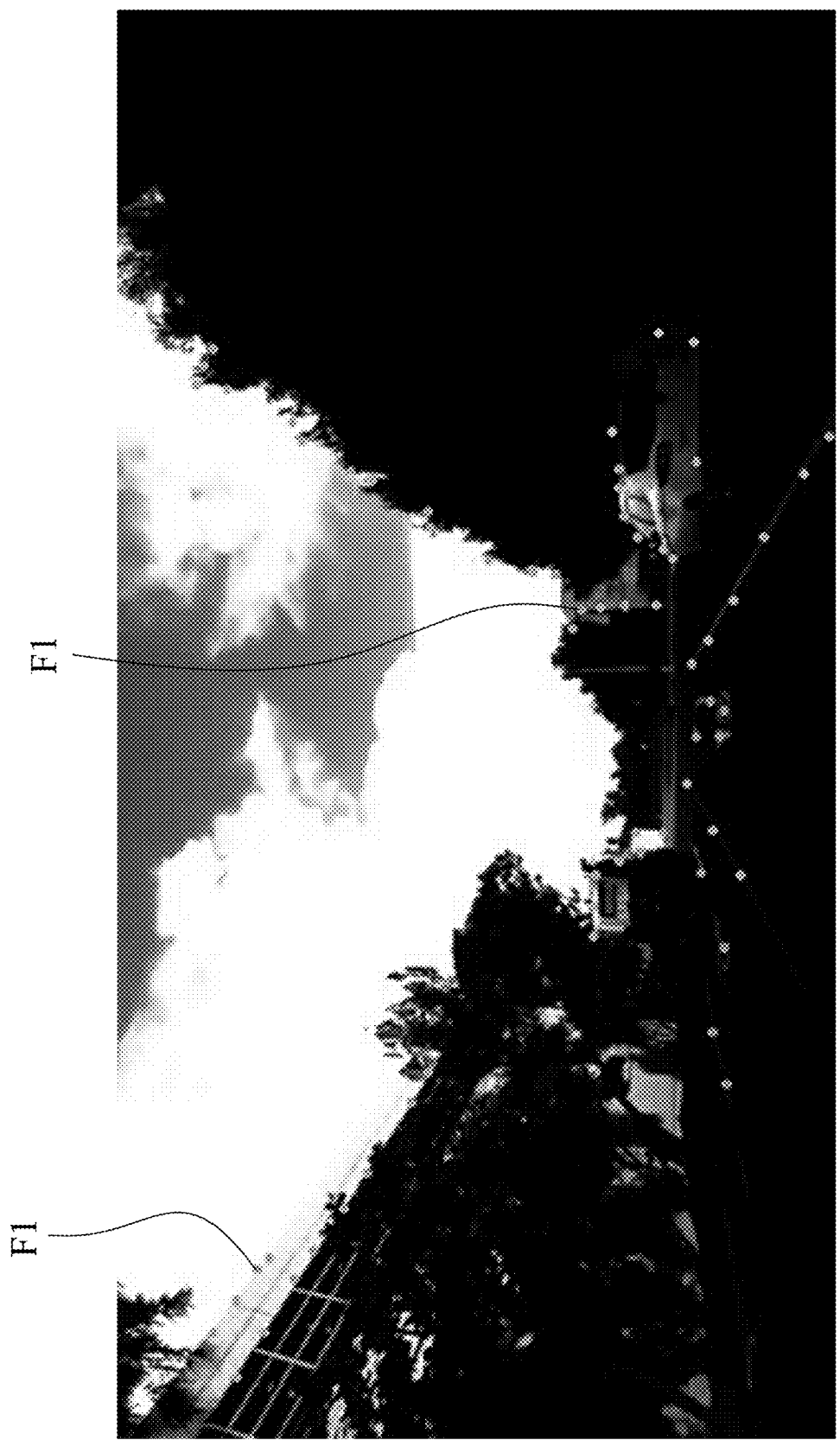
FIG. 2 is an illustration showing the first feature points in one image generated by the machine vision detecting unit of the feature point integration positioning system of FIG. 1.

FIG. 2 is an illustration showing the first feature points F1 in one image generated by the machine vision detecting unit 131 of the feature point integration positioning system 100 of FIG. 1, only two of the first feature points F1 are labeled, and the present disclosure is not limited thereto. Please refer to FIG. 2 with reference to FIG. 1, the machine vision detecting unit 131 can use, but not limited to, conventional feature points obtaining algorithms such as an ORB (Oriented FAST and Rotated BRIEF) algorithm or a SIFT (Scale-Invariant Feature Transform) algorithm to obtain the first feature points F1 in each of the images. As shown in FIG. 2, the machine vision detecting unit 131 can identify each item in the image, i.e., the road markings, and the vehicles and buildings on the side of the road, to generate corresponding first feature points F1. However, owing to the high light contrast, the trees in the road straight ahead cannot be identified, and the boundaries of the buildings on the side of the road where the light contrast is high are also lost.

Figure 3:
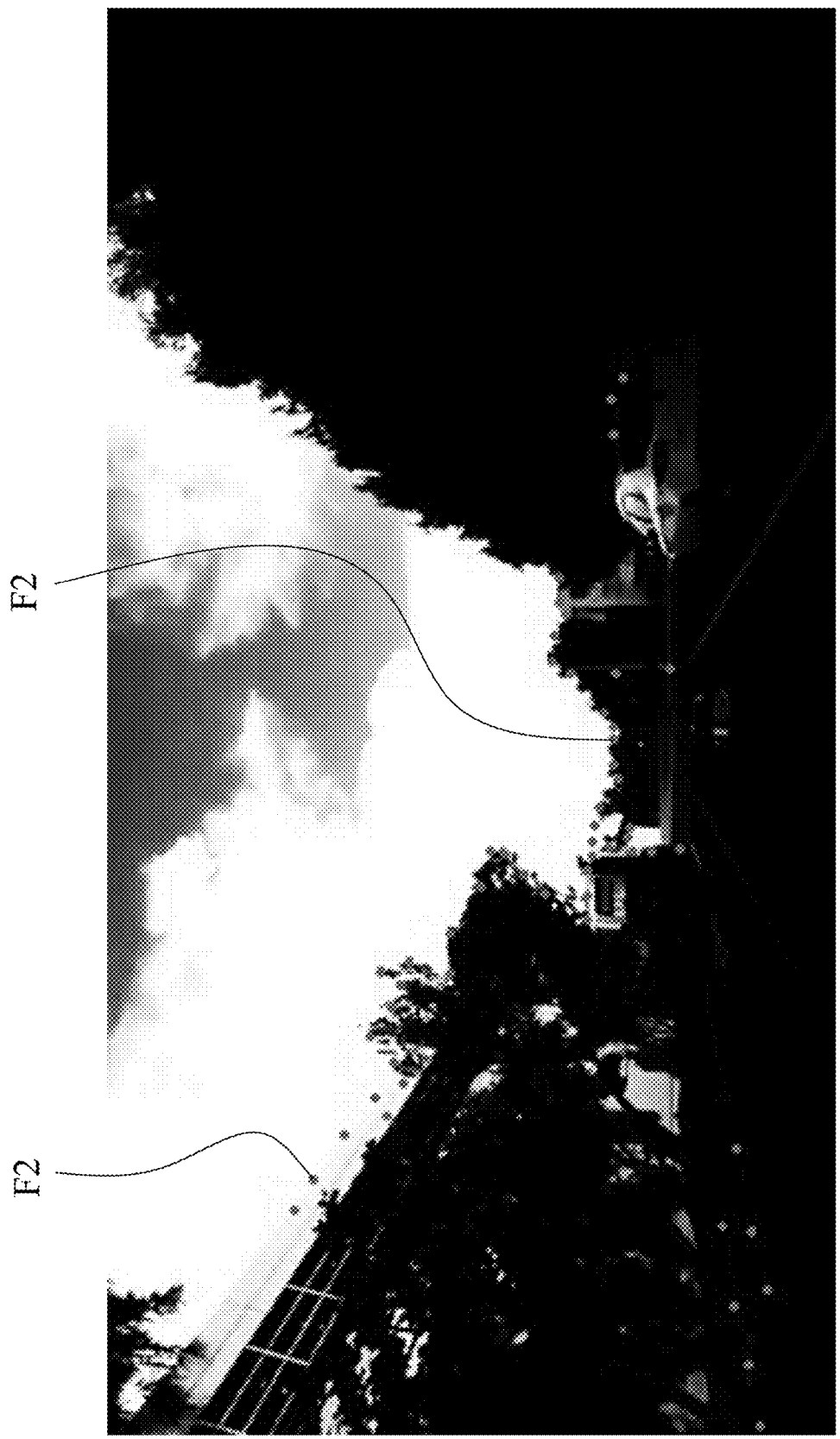
FIG. 3 is an illustration showing the second feature points in one image generated by the deep learning detecting unit of the feature point integration positioning system of FIG. 1.

FIG. 3 is an illustration showing the second feature points F2 in one image generated by the deep learning detecting unit 132 of the feature point integration positioning system 100 of FIG. 1, only two of the second feature points F2 are labeled, and the present disclosure is not limited thereto. Please refer to FIG. 3 with references to FIGS. 1 and 2, the deep learning detecting unit 132 can be trained in advance, and a constructed deep learning model can be used to identify the images. A lot of environment variation images which have large environment variations such as the high light contrast or the direction change can be used as the learning sources, which can be favorable for training a deep learning model suitable for environment variations. As shown in FIG. 3, the identified image is the same as the image of FIG. 2, and the deep learning detecting unit 132 can clearly identify the trees in the road straight ahead, and the boundaries of the buildings on the side of the road where the light contrast is high.

Figure 4:
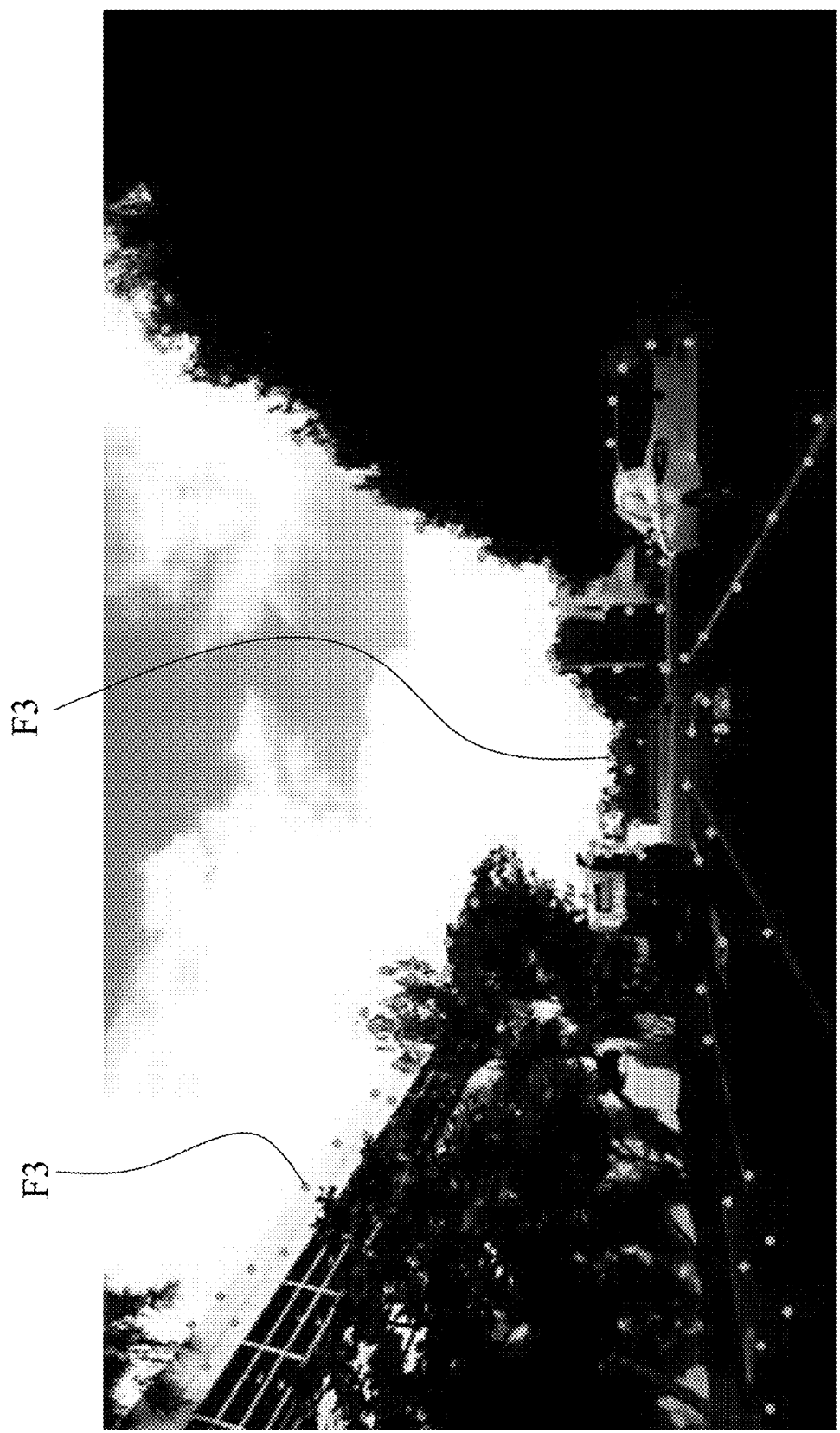
FIG. 4 is an illustration showing the integrated feature points in the integrated image generated by the integrating unit of the feature point integration positioning system of FIG. 1.

FIG. 4 is an illustration showing the integrated feature points F3 in the integrated image generated by the integrating unit 133 of the feature point integration positioning system 100 of FIG. 1, only two of the integrated feature points F3 are labeled, and the present disclosure is not limited thereto. Please refer to FIG. 4 with references to FIGS. 1, 2 and 3, after the first feature points F1 and the second feature points F2 are generated, the first feature points F1 and the second feature points F2 can be integrated by the integrating unit 133. Precisely, all the second feature points F2 in the image can be superimposed on all the first feature points F1 in the image to form the integrated feature points F3. In other words, the integrated feature points F3 include all the first feature points F1 and all the second feature points F2; as a result, the identified result from the machine vision detecting unit 131 and the identified result from the deep learning detecting unit 132 can be remained.

For conventional feature point obtaining methods, the identification of the feature points is limited in high variated environment. For example, as the front light is too strong, some feature points that can be seen by human eyes may be lost. If the light of the whole image is adjusted, the feature points that are originally identified may be lost. Hence, the present disclosure uses the machine vision detecting unit 131 and the deep learning detecting unit 132 to identify the same image, and the deep learning detecting unit 132 can focus on the position where the machine vision detecting unit 131 is hard to identify and to find the first feature points F1 so as to obtain the second feature points F2 for compensating the insufficiency of the machine vision detecting unit 131. Consequently, the integrated feature points F3 are not affected by the light or the environment variations and the features of each item in the image can be completely shown. After forming the integrated feature points F3, the positioning module 140 can confirm the position of the moving object 110 relative to the environment based on two continuous images to complete localization. Since the feature points in two images can be completely shown, the position will not be lost.

Figure 5:
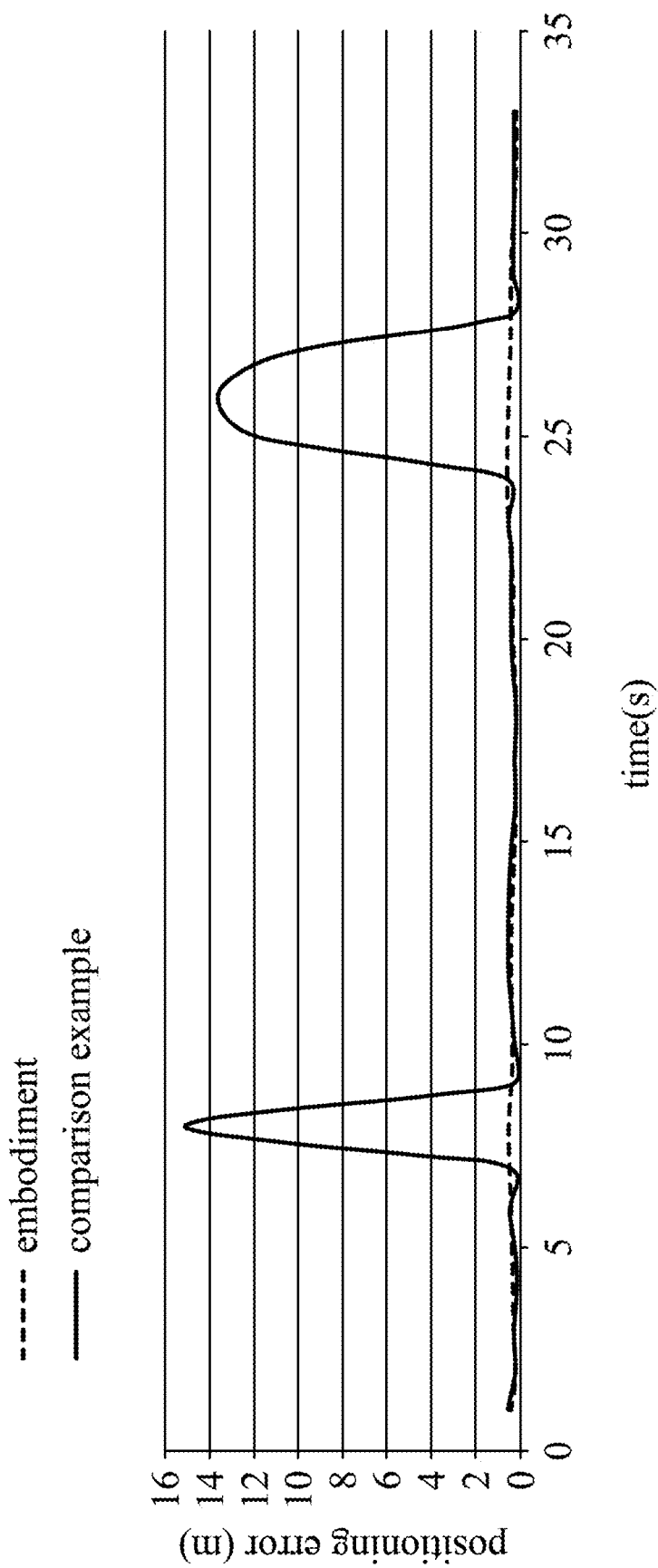
FIG. 5 is a relation between positioning errors and time according to the feature point integration positioning system of FIG. 1 and a comparison example.

Please refer to FIG. 5 with references to FIGS. 1 to 4, FIG. 5 is a relation between positioning errors and time according to the feature point integration positioning system 100 of FIG. 1 and a comparison example, and the comparison example is a positioning result based on only the first feature points F1, which is used to simulate a positioning system using the conventional featuring point obtaining method. As shown in FIG. 5, the positioning errors of the positioning system of the comparison example are larger, and the positioning stability is not enough. However, the positioning errors of the embodiment of FIG. 1 remain in a small range, and the positioning stability thereof is good.

Additionally, the feature point integration positioning system 100 can further include a mapping module 150 configured to construct a map of the environment, and can construct each article in the environment based on the integrated feature points F3, each article corresponding to each item of the image.

Figure 6:
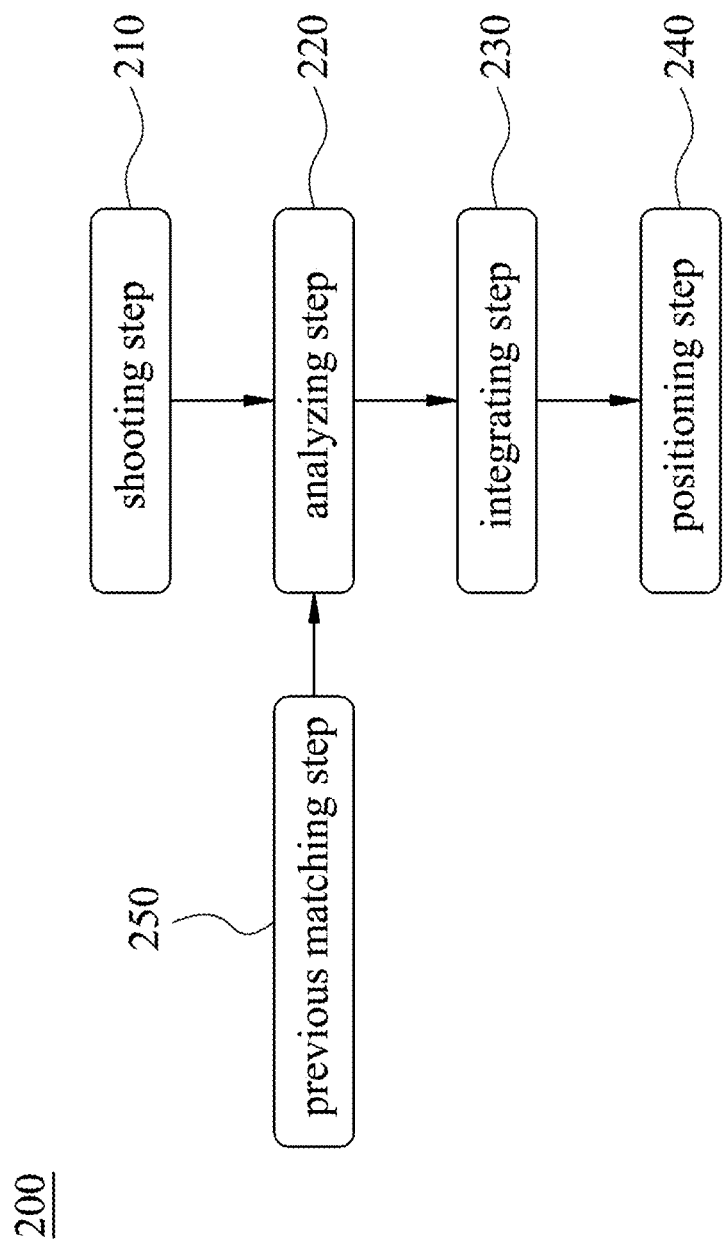
FIG. 6 is a block diagram showing a feature point integration positioning method according to another embodiment of the present disclosure.

FIG. 6 is a block diagram showing a feature point integration positioning method 200 according to another embodiment of the present disclosure. Please refer to FIG. 6 with references to FIGS. 1 to 4, a feature point integration positioning method 200 includes a shooting step 210, an analyzing step 220, an integrating step 230 and a positioning step 240, and the details of the feature point integration positioning method 200 will be illustrated in association with the feature point integration positioning system 100 hereinafter.

In the shooting step 210, an environment is shot by an image input source 120 to obtain a sequential image dataset, the sequential image dataset includes a plurality of images, and each of the images corresponds to each of a plurality of time points.

In the analyzing step 220, a plurality of first feature points F1 in each of the images are generated by a machine vision detecting unit 131 based on each of the images, and a plurality of second feature points F2 in each of the images are generated by a deep learning detecting unit 132 based on each of the images.

In the integrating step 230, the first feature points F1 and the second feature points F2 in each of the images are integrated by an integrating unit 133 into a plurality of integrated feature points F3 in each of the images.

In the positioning step 240, a moving object 110 is positioned according to the integrated feature points F3 in each of the images.

Therefore, the moving object 110 is allowed to move in an unknown environment, the shooting step 210 can be executed to shoot each image corresponding to each time point, and the images can be transmitted to the machine vision detecting unit 131 and the deep learning detecting unit 132 via a wired transmission or a wireless transmission for executing the analyzing step 220 to generate the first feature points F1 and the second feature points F2 in the same image, respectively. Subsequently, the integrated step 230 is executed, the integrating unit 133 can obtain the first feature points F1 and the second feature points F2 via the wired transmission or the wireless transmission, and all the first feature points F1 and all the second feature points F2 can be superimposed to form the integrated feature points F3 in each image. Moreover, in the integrating step 230, a spatial geometry model constructed by the multiple view geometry in computer vision can be used by the integrating unit 133 to obtain a three-dimensional point group dataset of the integrated feature points F3 in each of the images. In the three-dimensional point group, each feature point is obtained by the algorithms in the machine vision detecting unit 131 and the deep learning detecting unit 132 and includes feature descriptions such as the position and the feature vectors. Finally, in the positioning step 240, the position relation between the moving object 110 and the environment can be found by two continue images, and the localization can be done. Furthermore, in the positioning step 240, a map can be constructed by the integrated feature points F3 in each of the images.

The feature point integration positioning method 200 can further include a previous matching step 250. The previous matching step 250 includes the follows. The deep learning detecting unit 132 can be trained by a plurality of environment variation images to construct a deep learning model for the deep learning detecting unit 132. Two experimental images which are arranged in time sequence are analyzed by the machine vision detecting unit 131 to generate a plurality of previous first experimental feature points and a plurality of following first experimental feature points, respectively. The two experimental images are analyzed by the deep learning detecting unit 132 using the deep learning model to generate a plurality of previous second experimental feature points and a plurality of following second experimental feature points, respectively. The previous first experimental feature points and the previous second experimental feature points are integrated into a plurality of previous integrated experimental feature points by the integrating unit 133, and the following first experimental feature points and the following second experimental feature points are integrated into a plurality of following integrated experimental feature points by the integrating unit 133. The following integrated experimental feature points and the previous integrated experimental feature points are matched to obtain a degree of similarity. If the degree of similarity is equal to or larger than a threshold value, the deep learning model is adapted by the deep learning detecting unit 132 in the analyzing step 220, and if the degree of similarity is lower than the threshold value, the previous matching step 250 is repeated to retrain the deep learning detecting unit 132 to construct another deep learning model for the deep learning detecting unit 132, and the following integrated experimental feature points and the previous integrated experimental feature points are updated to obtain another degree of similarity. In other words, the present disclosure use the previous matching step 250 to find the optimal deep learning model, and as the feature point integration positioning system 100 is carrier out, the deep learning detecting unit 132 can use the optimal deep learning model to obtain the second feature points F2, then the integrated feature points F3 can be generated by the integrating unit 133, and no matching is required.

FIG. 7 is a flow chart showing a previous matching step 250 of the feature point integration positioning method 200 of FIG. 6. Please refer to FIG. 7 with references to FIGS. 1 to 6, in the previous matching step 250, the substep 251 can be executed to train the deep learning detecting unit 132. The environment variation images used to train the deep learning detecting unit 132 can include a plurality of items having light variations or position variations. One part of the environment variation images can be similar to the image of FIG. 2, which includes items such as the sky, the road, the trees and the buildings. Since the light variation between the sky and the trees is large, the boundaries of the trees atomize and are not easily detected. Another part of the environment variation images can include corners, and because the position variations thereof are large, the detected feature points in the previous image will disappear in the following image. In the abovementioned environment variation images, the deep learning detecting unit 132 can be trained to focus on the positons where the machine vision detecting unit 131 cannot identify easily, thereby increasing the amount and the accuracy of the second feature points F2 detected in the environment having serious changes. The training can focus on specific scenes but not on general features such that the correct and useful feature points can be found to compensate the insufficiency of the machine vision detecting unit 131.

Subsequently, the substep 252 can be executed to obtain two experimental images which can be obtained by the image input source 120 in real-time or can be obtained from the files stored in the database, and the present disclosure is not limited thereto. In the substep 253, the machine vision detecting unit 131 can analyze the two experimental images to generate the previous first experimental feature points and the following first experimental feature points. In the substep 254, the deep learning detecting unit 132 can analyze the two experimental images to generate the previous second experimental feature points and the following second experimental feature points. The substep 255 can be then entered to allow the integrating unit 133 to generate the previous integrated experimental feature points and the following integrated experimental feature points. Please be noted that the substep 253 and the substep 254 can be executed simultaneously, or the previous first experimental feature points, the previous second experimental feature points and the previous integrated experimental feature points can be generated prior to the following first experimental feature points, the following second experimental feature points and the following integrated experimental feature points, and the present disclosure is not limited to. The previous first experimental feature points and the following first experimental feature points can be deemed as the first feature points F1 when the feature point integration positioning system 100 is carried out, the previous second experimental feature points and the following second experimental feature points can be deemed as the second feature points F2 when the feature point integration positioning system 100 is carried out, and the previous integrated experimental feature points and the following integrated experimental feature points can be deemed as the integrated feature points F3 when the feature point integration positioning system 100 is carried out. The feature points obtaining method and the integrating method are the same, and only the names are different.

Moreover, in the substep 256, the matching is executed. As matching the following integrated experimental feature points and the previous integrated experimental feature points, a plurality of Euclidean distances are calculated, or a plurality of angles are calculated. The difference between the Euclidean distances and the variation between the angles can be used to calculate the degree of similarity. The higher the degree of similarity is, the easier the localization is, and the stability thereof is high. The threshold value of the degree of similarity can be, but not limited to, 75%.

Finally, the substep 257 is executed to check whether the degree of similarity is larger than or equal to the threshold value. If yes, the previous integrated experimental feature points and the following integrated experimental feature points are much similar, and the feature points are not easily lost, which means the deep learning model is suitable, and can be used when the feature point integration positioning system 100 is carried out. At this time, the substep 258 is entered to complete the previous matching step 250. In contrast, it has to go back to the substep 251 to retrain the deep learning detecting unit 132.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A non-transitory computer-readable memory, storing a computer program which is executed by a processor for:
   obtaining a sequential image dataset from an image input source shooting an environment, wherein the sequential image dataset comprises a first to a last images, and the first to the last images respectively correspond to a first to a last time points; and
   generating a plurality of first feature points in the first image by a machine vision detecting method, generating a plurality of second feature points in the first image by a deep learning detecting method, integrating the first feature points and the second feature points in the first image into a plurality of integrated feature points in the first image, and receiving the integrated feature points in the first image to confirm a position of a moving object relative to the environment at the first time point, wherein each of the first feature points and the second feature points represents a point in the first image, and at least one of the second feature points is different from any one of the first feature points, wherein the first feature points and the second feature points are the points in the first image where gray values vary in high light contrast.

2. The non-transitory computer-readable memory of claim 1, wherein a spatial geometry model is used to obtain a three-dimensional point group dataset of the integrated feature points in the first image.

3. The non-transitory computer-readable memory of claim 1, wherein a map is constructed by the integrated feature points in the first image.

4. The non-transitory computer-readable memory of claim 1, wherein a plurality of environment variation images are previously used to construct a deep learning model, and the deep learning model is used to identify the second feature points.

5. The non-transitory computer-readable memory of claim 4, wherein a plurality of items in each of the environment variation images have light variations or position variations.

6. The non-transitory computer-readable memory of claim 1, wherein an oriented fast and rotated brief algorithm or a scale-invariant feature transform algorithm is used to obtain the first feature points in the first image.

* * * * *